(12) United States Patent
van Diggelen et al.

(10) Patent No.: US 7,693,660 B2
(45) Date of Patent: Apr. 6, 2010

(54) COMPUTING LONG TERM ORBIT AND CLOCK MODELS WITH VARIABLE TIME-HORIZONS

(75) Inventors: Frank van Diggelen, San Jose, CA (US); Matthew Riben, Cupertino, CA (US)

(73) Assignee: Global Locate, Inc., San Jose, CA (US)

(*) Notice: Subject to any disclaimer, the term of this patent is extended or adjusted under 35 U.S.C. 154(b) by 627 days.

(21) Appl. No.: 11/703,526

(22) Filed: Feb. 7, 2007

(65) Prior Publication Data

US 2008/0024361 A1    Jan. 31, 2008

Related U.S. Application Data

(60) Provisional application No. 60/765,925, filed on Feb. 7, 2006.

(51) Int. Cl.
*G01C 21/24* (2006.01)
*G06F 19/00* (2006.01)

(52) U.S. Cl. .................. 701/226; 701/13; 701/221; 342/358

(58) Field of Classification Search .......... 701/226, 701/13, 215, 221; 342/357.03, 357.06, 357.14, 342/357.15, 358
See application file for complete search history.

(56) References Cited

U.S. PATENT DOCUMENTS

| | | | |
|---|---|---|---|
| 5,864,489 A * | 1/1999 | Claffey et al. ............. 703/2 |
| 6,058,338 A | 5/2000 | Agashe et al. | |
| 6,133,874 A | 10/2000 | Krasner | |
| 6,211,819 B1 | 4/2001 | King et al. | |
| 6,285,315 B1 | 9/2001 | Pratt | |
| 7,443,340 B2 * | 10/2008 | Abraham et al. ....... 342/357.06 |
| 2002/0188403 A1 | 12/2002 | LaMance et al. | |
| 2005/0103941 A1 * | 5/2005 | Ebert et al. ................ 244/164 |
| 2005/0212700 A1 | 9/2005 | Diggelen et al. | |

FOREIGN PATENT DOCUMENTS

| | | |
|---|---|---|
| EP | 1 336 866 | 8/2003 |
| WO | 02/103383 | 12/2002 |

OTHER PUBLICATIONS

International Search Report mailed Jul. 10, 2007 for PCT Application No. PCT/US2007/003307.
Written Opinion mailed Jul. 10, 2007 for PCT Application No. PCT/US2007/003307.
European Search Report for European Patent Application No. 07717221.1-2220, dated Jan. 22, 2010.

* cited by examiner

*Primary Examiner*—Tan Q Nguyen
(74) *Attorney, Agent, or Firm*—McAndrews Held & Malloy, Ltd.

(57) ABSTRACT

A method and apparatus for determining long term orbit (LTO) models using variable time-horizons to improve the orbit and clock model accuracy. The method and apparatus use either historic ephemeris or historic measurements for at least one satellite to produce an orbit parameter prediction model (an LTO model). The parameter predicted by the model is compared to an orbit parameter of a current broadcast ephemeris. The result of the comparison (an indicia of accuracy for the model) is used to establish a time-horizon for the orbit parameter prediction model for that particular satellite. Such a time-horizon may be established in this manner for each satellite within a satellite constellation.

25 Claims, 4 Drawing Sheets

COMPUTING LONG TERM ORBIT AND CLOCK MODELS WITH VARIABLE TIME-HORIZONS

CROSS-REFERENCE TO RELATED APPLICATIONS

This application claims benefit of U.S. provisional patent application Ser. No. 60/765,925, filed Feb. 7, 2006, which is herein incorporated by reference.

BACKGROUND OF THE INVENTION

1. Field of the Invention

The present invention generally relates to global navigation satellite system (GNSS) receivers and, more particularly, to a method and apparatus for generating long term orbit (LTO) models used by assisted GNSS receivers.

2. Description of the Related Art

Global Navigation Satellite System (GNSS) receivers require satellite navigation data in order to compute pseudo-ranges to the satellites of the GNSS system and, in turn, compute a position of the GNSS receiver. GNSS include such systems as GPS, GLONASS, and GALILEO. The satellite navigation data (i.e., commonly referred to as ephemeris) comprises both satellite orbits and clock models. Traditionally, GNSS receivers have decoded this navigation data from the broadcast signal transmitted by each satellite. More recently, Assisted-GNSS (or 'A-GNSS') receivers have received the broadcast data through an alternative communications channel, for example: a cellular telephone data connection. Yet more recently, the satellite navigation data has been modeled for long periods (i.e., days) in the future, and provided to A-GNSS receivers through a communications channel, or through some synchronization means such as through the docking port between a personal digital assistant (PDA) and a personal computer (PC), the PC connected to the Internet, and the data provided over the Internet.

Long Term Orbit and Clock models (collectively referred to as 'LTO' or sometimes referred to as extended ephemeris) provide satellite navigation data for long periods (days) in the future. One method of producing LTO measures the ranges to the satellites, using code phase measurements or carrier phase measurements, and fits these ranges to standard orbit models and clock models. An example of such a method is described in U.S. Pat. No. 6,542,820, which is hereby incorporated herein in its entirety. This patent also describes using ephemeris data (i.e., broadcast navigation data) as the input information from which LTO is computed. It has been found that the longer into the future the LTO is used, the less accurate it becomes. In particular, after several days, the median accuracy for the orbits and clock models may be quite accurate (i.e., within a few meters after several days), but the worst case accuracy may be large (i.e., tens of meters after several days). "Median" and "worst case" mean the median and worst case across the set of satellites. In particular, the worst case satellite clock model can be incorrect by much more than the orbit accuracy.

The official US government agency for disseminating orbit and dock data to the general public is the National Oceanic and Atmospheric Administration. The following information is from the USCG Navigation Center: 'The U.S. Department of Transportation's Civil GPS Service has designated NOAA to be the federal agency responsible for providing accurate and timely Global Positioning System (GPS) satellite ephemerides ("orbits") to the general public.' GPS satellite orbits can be found at http://www.ngs.noaa.gov/GPS/GPS.html.

Historic orbits are available (used for post-process positioning, for example, for surveying, measuring continental drifts, and the like) as well as limited future orbits. The types of data, latency and quoted accuracy of these orbits and clocks are listed in TABLE I.

TABLE I

| Data | Latency | Quoted Orbit accuracy | Quoted Clock accuracy |
| --- | --- | --- | --- |
| "Precise Orbits" | 14 to 19 days | <5 cm | <0.1 ns (0.1 ns = 0.03 m) |
| "Rapid Orbits" | 1 day | <5 cm | 0.1 ns (0.1 ns = 0.03 m) |
| "Ultra Rapid Orbits" | Up to approx 18 hours in the future | ~10 cm | ~5 ns (5 ns = 1.5 m) |

(in parentheses is shown the equivalent pseudo-range error in meters for the clock errors expressed in nanoseconds)

However, the worst case clock accuracy of the "Ultra Rapid Orbits" is many times worse than the quoted accuracy. This is immediately apparent when the clock values from the "Rapid Orbits" are compared to the clock predictions from the "Ultra Rapid Orbits".

FIG. 1 depicts a graphical representation of a change in clock offset for both Rapid clock values and Ultra rapid clock predictions over the same period for all satellites. The pseudo-random number (PRN) code for each satellite is shown at the end of each of the plots. The Rapid clock values are made from measured data. The Ultra Rapid predictions are predictions up to one day in the future, made using data gathered in the past. The difference between measured values and predictions is not easily visible on the scale of FIG. 1, but is clearly in FIG. 2 which shows the Ultra Rapid predictions minus the Rapid clock values.

For many satellites the change in the clocks over one day is not very large (less than 100 m, or 0.33 microseconds), but for a few satellites (e.g., PRN 6 and 25 of FIG. 1) the change is large (on the order of kilometers, or several microseconds). This makes a significant difference in how difficult it is to predict these clocks, as shown in FIG. 2.

FIG. 2 depicts a graphical representation of the difference between the Ultra Rapid clock predictions and the Rapid clock values. According to the table of accuracy, the Ultra Rapid prediction is expected to agree with the Rapid clock value to within about 1.5 meters; and indeed this is true for many of the satellites, but for the worst-case satellites the error is an order of magnitude larger.

FIGS. 1 and 2 are a reflection of the state of the art: for most satellites, it is possible to predict the clock to within one or two meters for one day in the future, but for some satellites the prediction is worse than 10 meters one day in the future.

Therefore, there is a need in the art for a technique for determining future orbit and clock models with increased orbit and clock accuracy.

SUMMARY OF THE INVENTION

The present invention is a method and apparatus for determining long term orbit (LTO) models using variable time-horizons to improve the orbit and clock model accuracy. The present invention produces an orbit parameter prediction model (an LTO model) for at least one satellite. The parameter predicted by the model is compared to an orbit parameter of a current broadcast ephemeris. The result of the comparison (an indicia of model accuracy) is used to establish a time-horizon for the orbit parameter prediction model for that particular satellite. The time-horizon defines a period of time in which the orbit parameter prediction model is accurate. Such a time-horizon may be separately established in this manner for each satellite within a satellite constellation.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 3:
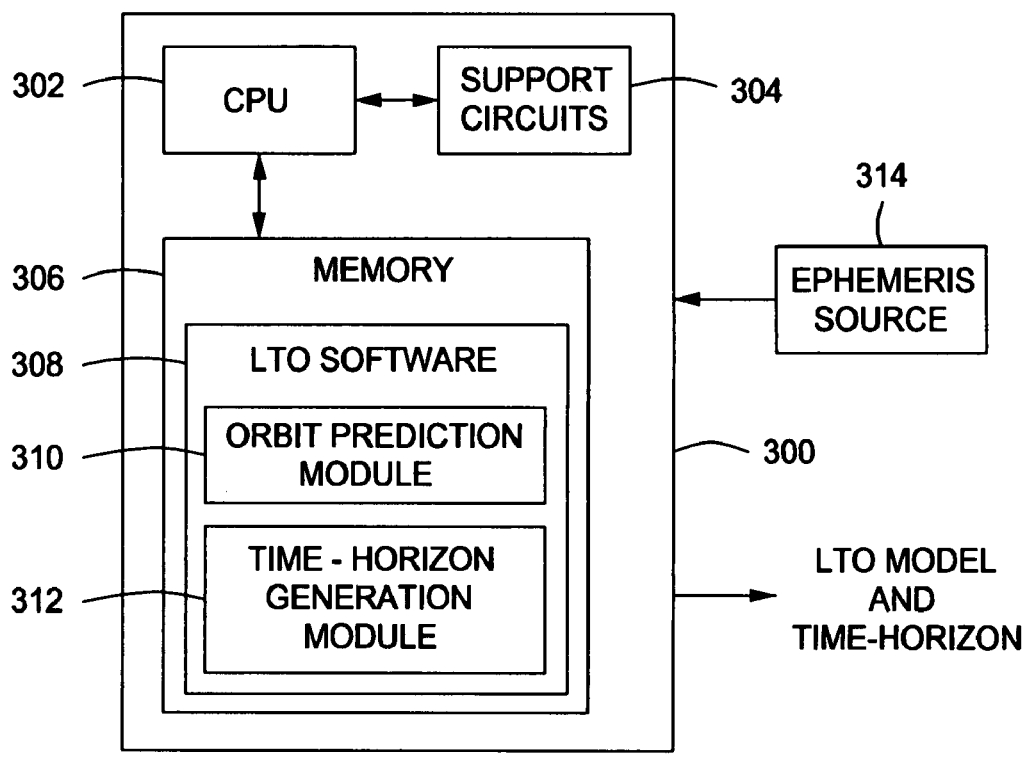
FIG. 3 depicts a computer system used for generating LTO and the time horizons therefore in accordance with one embodiment of the present invention.

FIG. 3 depicts a computer system 300 used for creating long term orbit (LTO) models using variable time horizons in accordance with the present invention. The computer system 300 comprises a central processing unit (CPU) 302, support circuits 304 and memory 306. The processor 302 may be one or more commercially available microprocessors or microcontrollers. The support circuits 304 comprise well-known circuits used to facilitate operation of the CPU 302 including, but not limited to, cache, clock circuits, power supplies, input/output circuits, and the like. The memory 306 comprises one or more digital storage circuits or devices including, but not limited to, random access memory, read only memory, optical memory, disk drives, removable storage, and the like. The memory 306 stores LTO software 308 that, when executed by the CPU 302, causes the CPU 302 to perform a method of generating at least one LTO model in accordance with the present invention. The LTO software 308 comprises an orbit prediction module 310 for generating LTO models and a time-horizon generation module 312 for generating time horizons that identify the length of time an LTO model for a particular satellite is accurate. In one embodiment, the LTO models are generated using historical ephemeris provided by an ephemeris source 314. Such an ephemeris source may comprise a server of such information, one or more GNSS receivers for collecting ephemeris and storing the ephemeris, and the like.

In an alternative embodiment, satellite signal measurements can be used to compute pseudo-ranges to the satellites and Doppler frequencies of the satellites. This computed information can be used to generate historical orbit parameters to use in lieu of an ephemeris source 314.

Figure 4:
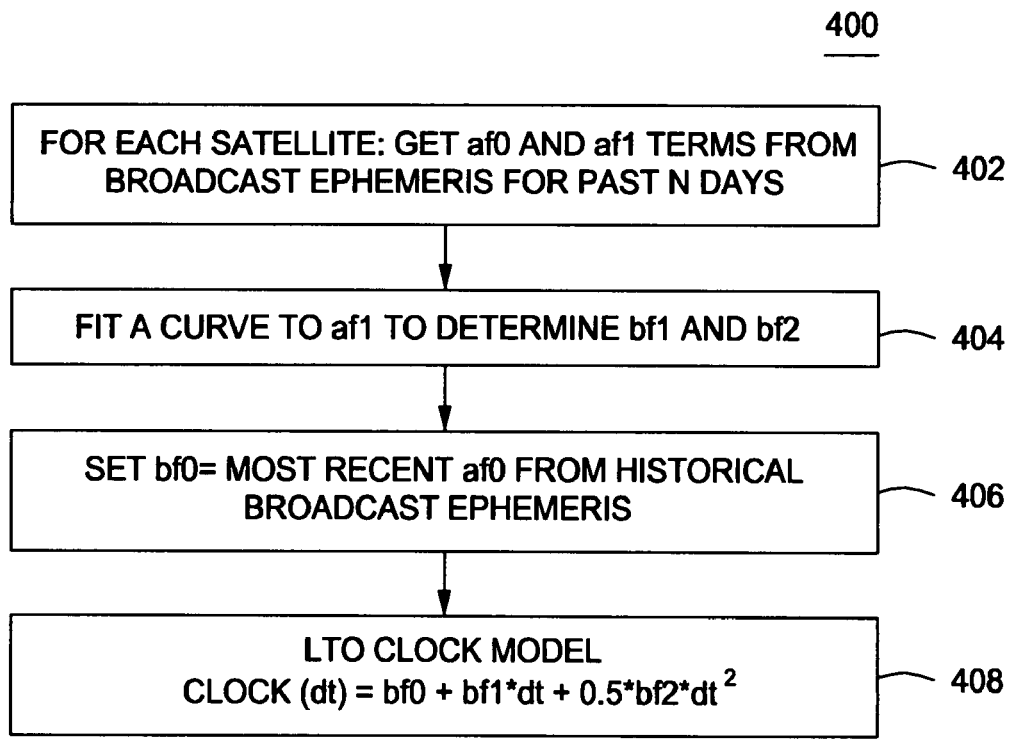
FIG. 4 depicts a flow diagram of a method of generating an LTO clock model in accordance with one embodiment of the present invention.

FIG. 4 depicts a flow diagram of a method 400 that improves the accuracy achieved by the IGS "Ultra Rapid" predictions in accordance with one embodiment of the present invention. The method 400 is used to generate an orbit parameter prediction model. In the embodiment described below, the orbit parameter prediction model is a clock model.

At step 402, for at least one satellite (but, generally, for each satellite in a GNSS constellation of satellites, or a subset thereof the method 400 collects the clock model from the broadcast ephemeris for the past N days (e.g., af0 and af1 terms for GPS clock models). In the one embodiment N is 2, but it could be longer or shorter.

At step 404, the method 400 performs a curve fit to the af1 terms of the navigation model. These are the rate terms. Since the broadcast af0 terms show a large amount of quantization, if the method 400 fits a curve to all the af0 terms, the resultant accuracy of the clock prediction is poor. However, a curve fit to the af1 terms yields much better results in the clock predictions. This curve is used to generate the predicted rate and acceleration terms for the clock model, i.e., the bf1 and bf2 terms.

At step 406, the most recent af0 term is used as the LTO clock offset at that time. Although this af0 term itself may have a quantization error on the order of one or two meters, this error is constant for the predictions since the method is only using one af0 term and not fitting a curve through several af0 terms. Thus, the quantization effect of the af0 does not affect the predicted rate or acceleration parameters.

At step 408, the method 400 generates the LTO clock model in terms of the parameters bf0, bf1 and bf2 (offset, rate and acceleration, respectively). Assuming accurate historical broadcast ephemeris (or computed historical orbit parameters) were used as the basis for the modeling of method 400, such a clock model can be used to predict the clock of a given GPS satellite for up to about 10 days into the future.

The method 400 generally generates accurate clock models. However, there are still some satellites that have poor accuracy (e.g., greater than 10 meters) after one or several days. The method 400 dramatically increases the overall accuracy of the LTO predictions if, in advance, the satellites that are likely to be poorly modeled are identified; and, for these satellites, the time-horizon of the predictions are limited to something less than the time-horizon of the other (better) satellites, i.e., using variable time-horizons in accordance with the present invention.

Figure 5:
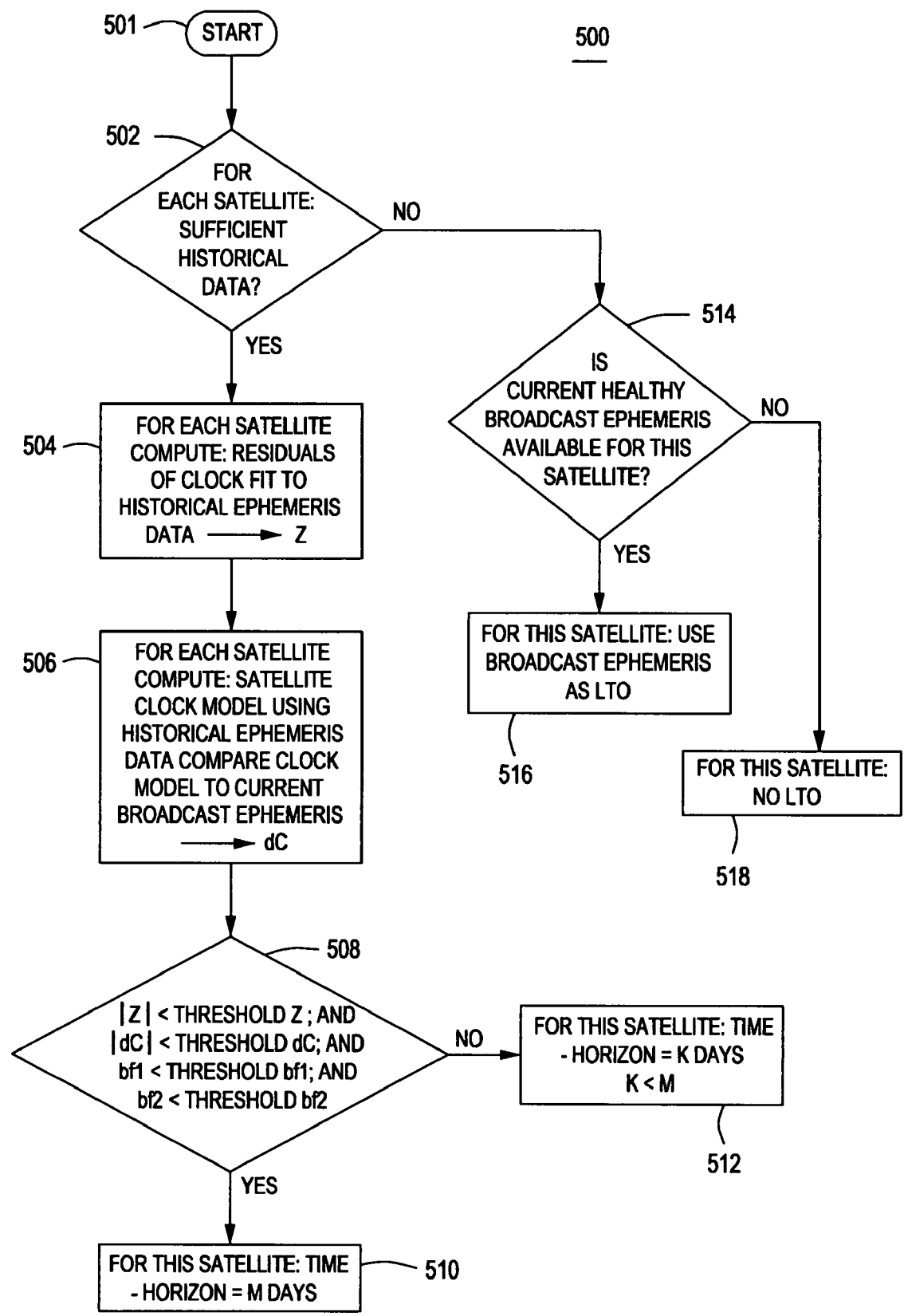
FIG. 5 depicts a flow diagram of a method of generating time horizons for satellite clock models in accordance with one embodiment of the present invention.

FIG. 5 depicts a flow diagram of a method 500 for generating time-horizons in accordance with the present invention for each of the clock models generated using method 400 of FIG. 4. The clock model for each satellite is associated with a time-horizon. After the time horizon is exceeded, the clock model is deemed inaccurate. In this manner, a GNSS receiver using the LTO models to assist in receiving GNSS satellite signals will only use the model for each particular satellite that is within the time-horizon for accuracy for that particular satellite. Consequently, by not using the "inaccurate" models, the overall accuracy of a position computed by the GNSS receiver is substantially improved.

The method 500 starts at step 501 and proceeds to step 502. At step 502, the method 500 queries, for each satellite, whether a sufficient amount of historical ephemeris data is available to generate a time-horizon. If the query is negatively answered, the method 500 proceeds to step 514, discussed below. However, if the query is affirmatively answered, the method 500 proceeds to step 504.

At step 504, the method 500 computes the residuals for the curve fit that was created by method 400. The residuals are a difference between the model bf1, bf2 and the historic af1 data. The smaller these residuals, the better the fit. The residuals form a first indicia of accuracy for the model.

At step 506, the method 500 computes, using the historical ephemeris data (or computed historical orbit parameters), a clock model that would have been generated some time ago (in this example, one day ago), then the method 500 compares that clock model with the current broadcast ephemeris, the error is labeled 'dC'. This error forms another indicia of accuracy for the model.

The clocks that are hard to model in the future generally behave that way for several days, so a clock that was hard to model yesterday is more likely to be harder to model tomorrow than any other clock. Also, the clocks that are hard to model more often have higher rates and accelerations than the clocks that are easy to model. Thus, at step 508, the method 500 compares the residuals, the 'dC' value, and the rate and acceleration terms. If all are below a defined set of threshold values, then, at step 510, there is a high probability that the clock prediction is good for the full M-days that are being predicted. If not, then, at step 512, the method 500 defines a smaller time-horizon, K. In one embodiment of the invention, M and K can be a real numbers (e.g., 0.5, 1, 1.5, 2 and so on). In an exemplary embodiment, M=2 and K=1 such that the time-horizon for any model not attaining the thresholds of step 508 is one-half of a model that does achieve the thresholds. In practice, this approach means that the LTO for more than 1 day in the future will have a fewer satellites (typically 3 to 6 fewer) than if the prediction time were fixed to be the same for all satellites. Thus, a 10% to 20% degradation of satellite availability is incurred more than 1 day hence; however, the worst case accuracy of the predictions of these removed satellites is frequently more than 100% worse than the worst case accuracy of the remaining satellites. In this way, the invention trades off a small loss of availability for a large gain in accuracy.

The method 400 of FIG. 4 uses historic ephemeris data from the previous N days to generate the predicted ephemeris as an LTO model. It will frequently happen that a satellite has recently been unhealthy; this means that the recent ephemeris is not valid, nor is any satellite observation of that satellite. For example: the operators of the satellites set the satellites to an unhealthy status when the orbits or clocks are being adjusted. Thus, neither the historic ephemeris nor the recent observations of that satellite can be used to predict the orbits or clocks as described above. In this case, the method 400 of the present invention cannot be used to produce an LTO model for an unhealthy satellite.

At step 502 of FIG. 5, the method 500 queries whether sufficient historical ephemeris is available to enable a time-horizon to be established. If the query is negatively answered, either insufficient ephemeris has been received or the satellite may be marked as unhealthy. In either instance, not enough information is available to accurately predict an orbit and/or clock. As such, the method 500 proceeds to step 514.

At step 514, the method queries whether current healthy broadcast ephemeris is available for the satellite. If the query is affirmatively answered, the method 500 proceeds to step 518 wherein the most recent broadcast ephemeris is used as an LTO model, e.g., basically the ephemeris data is used as LTO with a time-horizon set to the limit of accuracy of the ephemeris—between 2 to 4 hours. If such, current ephemeris is not available, i.e., the satellite is marked unhealthy, at step 516, no LTO is generated for that particular satellite.

A NANU is a "Notice Advisory to Navstar Users", a message from the GPS control segment to announce the status of the satellites. If there are scheduled changes to any satellites, the GPS control segment tries to forecast this change with 72 hours notice. By parsing the NANUs, the LTO method can limit the time-horizon of any satellite's LTO so that no LTO is produced for a period in the future where the satellite is expected to be unhealthy (i.e., where the satellite clock or orbit may be adjusted in an unpredictable way).

Figure 1:
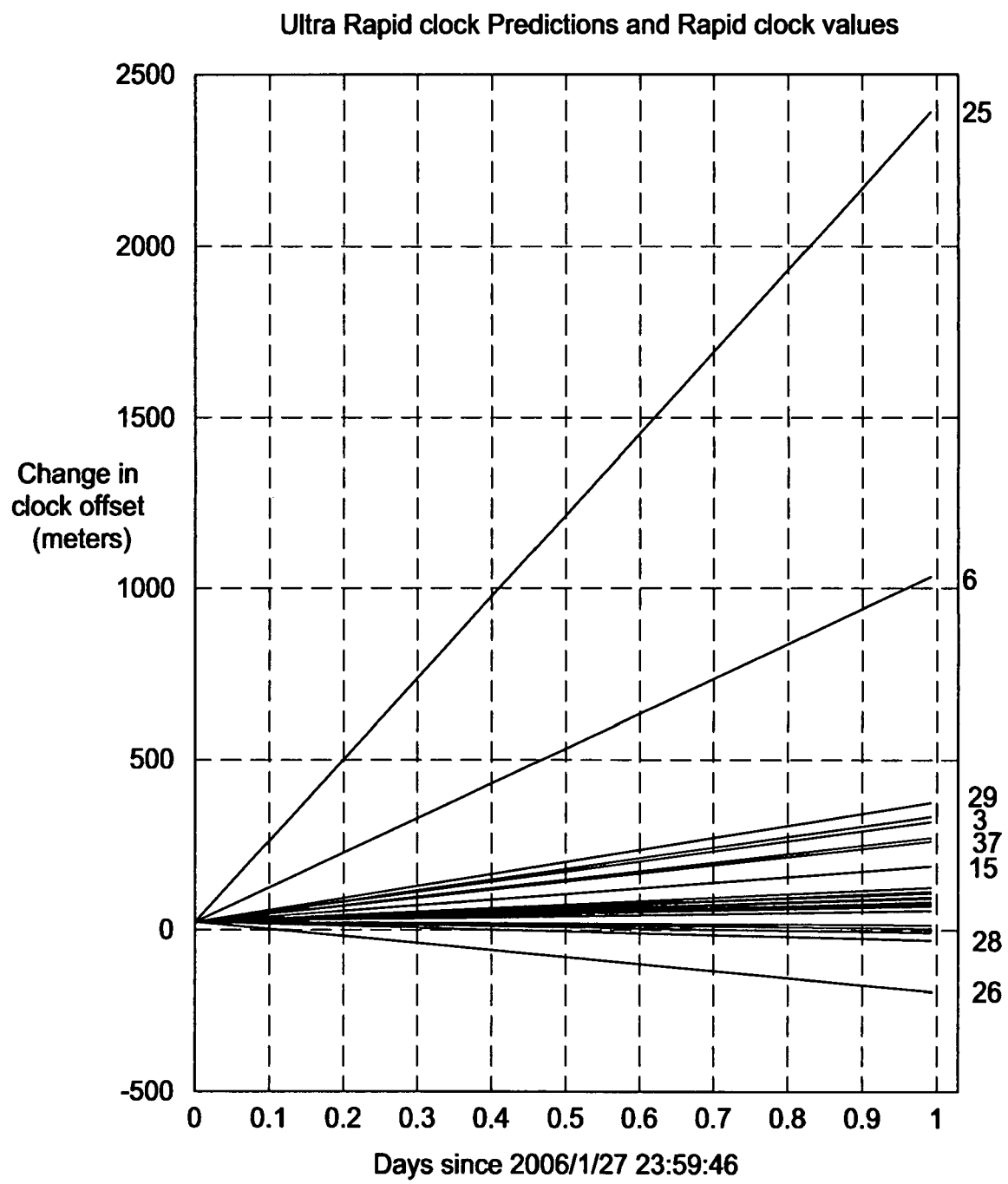
FIG. 1 is a graphical representation of a change in clock offset for both Rapid clock values and Ultra rapid clock predictions over the same period for all satellites.
Figure 2:
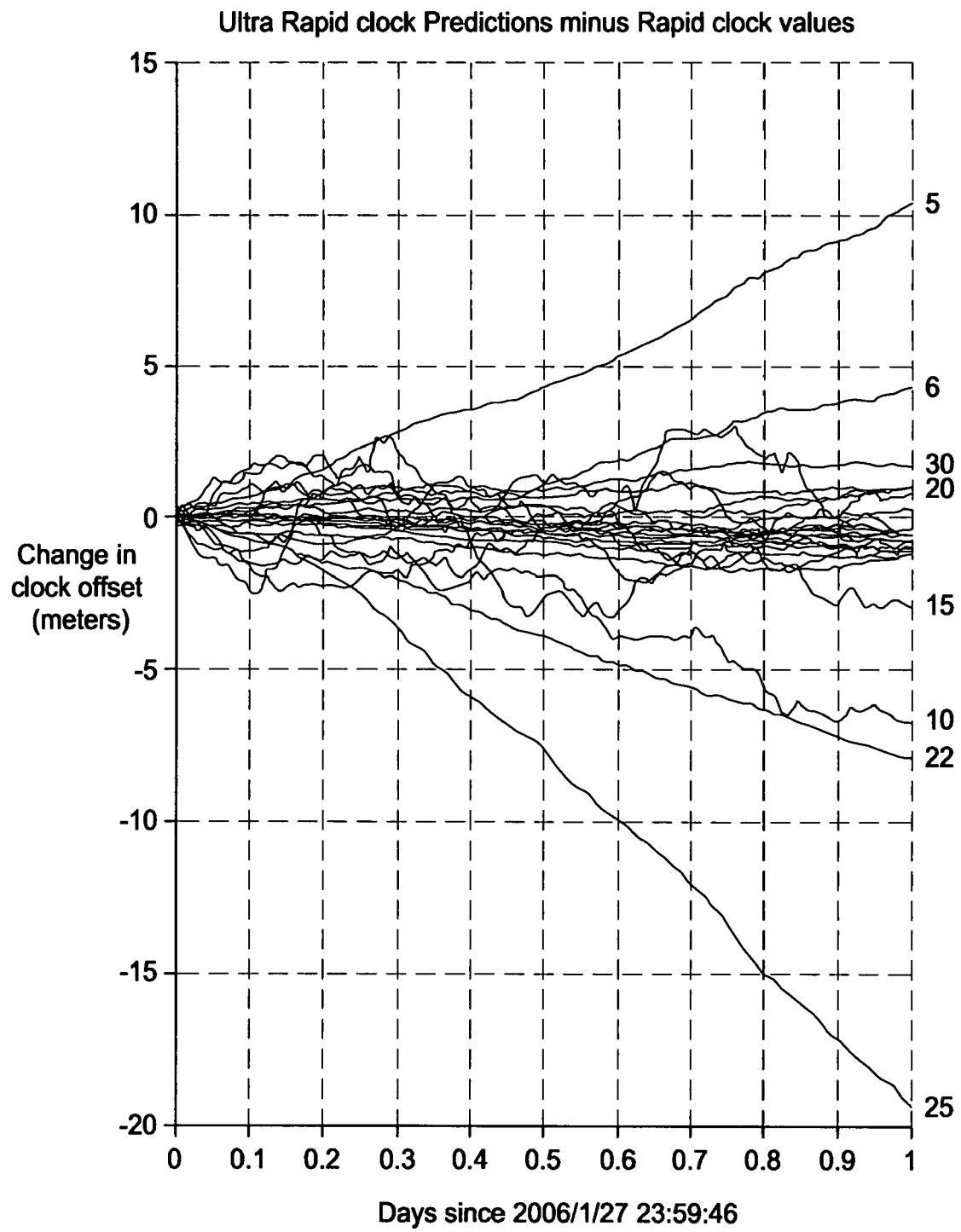
FIG. 2 depicts a graphical representation of the difference between the Ultra Rapid predictions and the Rapid clock values.

The above methods 400 and 500 focused on the clock prediction as the data that drives the variable time-horizon. This is because the state-of-the-art for clock prediction is not as advanced as for orbit prediction. As described with reference to FIG. 2, the IGS clock predictions are wrong by almost 20 m after one day, whereas the orbit predictions are much better understood, and more precise. However, the concept of variable time-horizon applies equally well to orbit prediction. The methods described above for the clock (i.e. checking residuals, checking how well a previous prediction fits current broadcast data, checking model parameters against thresholds) all apply to orbit predictions as well.

The method of the present invention has been tested on the GPS satellite navigation system, however, the concepts apply equally to any global navigation satellite system (GNSS), including the GLONASS and GALILEO systems.

While the foregoing is directed to embodiments of the present invention, other and further embodiments of the invention may be devised without departing from the basic scope thereof, and the scope thereof is determined by the claims that follow.

What is claimed is:

1. A method for generating time-horizons for long term orbit models for at least one satellite within a global navigation satellite system (GNSS) comprising:
   computing a predicted orbit parameter in an orbit parameter prediction model;
   producing an indicia of accuracy by comparing the predicted orbit parameter to a current orbit parameter;
   if the indicia of accuracy indicates at least a predefined level of accuracy, setting a time-horizon for the orbit parameter prediction model at a first value; and
   if the indicia of accuracy indicates less than the predefined level of accuracy, setting the time-horizon for the orbit parameter prediction model at a second value, where the second value is less than the first value.

2. The method of claim 1 wherein the computing step uses historical ephemeris for computing the predicted orbit parameter.

3. The method of claim 1 wherein the computing step uses measured signals from the at least one satellite for computing the predicted orbit parameters.

4. The method of claim 1 wherein the orbit parameter prediction model is a clock model.

5. The method of claim 1 wherein the orbit parameter prediction model is an orbit model.

6. The method of claim 1 wherein the time-horizon is associated with the orbit parameter prediction model for each satellite in a GNSS satellite constellation.

7. The method of claim 1 wherein the at least one satellite is a satellite within a satellite constellation for GPS, GLONASS or GALILEO.

8. The method of claim 1 wherein the indicia of accuracy comprises residuals from a curve fit of historical ephemeris used in the orbit parameter prediction model.

9. The method of claim 1 further comprising identifying whether the at least one satellite is healthy or unhealthy.

10. The method of claim 9 wherein, if the at least one satellite is unhealthy, determining whether broadcast ephemeris is available for the at least one satellite, and using an orbit parameter from the broadcast ephemeris as a predicted orbit parameter within the orbit parameter prediction model.

11. The method of claim 1 wherein the orbit parameter prediction model is a clock model comprising an offset term, a rate term and an acceleration term, where the offset term is set to an af0 term of the historical ephemeris and the rate term and acceleration term are set using a curve fit to an af1 term of the historical ephemeris.

12. The method of claim 1 wherein setting the time-horizon comprises setting the time-horizon prior to be prior to a scheduled change in at least one of satellite orbit and clock.

13. A method for generating long term orbit models for a plurality of satellites within a global navigation satellite system (GNSS) comprising:
   generating an orbit parameter prediction model for each satellite in the plurality of satellites; and
   generating a time-horizon, associated with each orbit parameter prediction model, within which the orbit parameter prediction model is accurate, where the time-horizon differs for at least one orbit parameter prediction model compared to the time-horizons associated with other orbit parameter prediction models.

14. The method of claim 13 wherein the time-horizon generating step further comprises:
   computing a predicted orbit parameter in an orbit parameter prediction model for each satellite in the plurality of satellites;
   producing an indicia of accuracy by comparing a predicted orbit parameter to a current orbit parameter;
   if the indicia of accuracy indicates at least a predefined level of accuracy, setting a time-horizon for the orbit parameter prediction model at a first value; and
   if the indicia of accuracy indicates less than the predefined level of accuracy, setting the time-horizon for the orbit parameter prediction model at a second value, where the second value is less than the first value.

15. The method of claim 14 wherein the computing step uses historical ephemeris for computing the predicted orbit parameter.

16. The method of claim 14 wherein the computing step uses measured signal from the at least one satellite for computing the predicted orbit parameter.

17. The method of claim 14 wherein the orbit parameter prediction model is a clock model.

18. The method of claim 14 wherein the orbit parameter prediction model is an orbit model.

19. The method of claim 14 wherein each satellite is a satellite within a satellite constellation for GPS, GLONASS or GALILEO.

20. The method of claim 14 wherein the indicia of accuracy comprises residuals from a curve fit of historical ephemeris used in the orbit parameter prediction model.

21. The method of claim 14 further comprising identifying whether each satellite is healthy or unhealthy.

22. The method of claim 21 wherein, for each unhealthy satellite, determining whether current broadcast ephemeris is available for the unhealthy satellite, and using an orbit parameter from the current broadcast ephemeris as a predicted orbit parameter within the orbit parameter prediction model.

23. The method of claim 13 wherein the orbit parameter prediction model is a clock model comprising an offset term, a rate term and an acceleration term, where the offset term is set to an af0 term of the historical ephemeris and the rate term and acceleration term are set using a curve fit to an af1 term of the historical ephemeris.

24. The method of claim 13 wherein generating the time-horizon comprises setting the time-horizon prior to be prior to a scheduled change in at least one of satellite orbit and clock.

25. Apparatus for generating long term orbit models for a plurality of satellites within a global navigation satellite system (GNSS) comprising:
   an orbit prediction module for generating an orbit parameter prediction model for each satellite in the plurality of satellites; and
   a time horizon prediction module for generating a time-horizon, associated with each orbit parameter prediction model, within which the orbit parameter prediction model is accurate, where the time-horizon differs for at least one orbit parameter prediction model compared to the time-horizons associated with other orbit parameter prediction models.

* * * * *